June 10, 1941.  E. P. BULLARD, 3D  2,245,384
CHUCK OPERATING MECHANISM
Filed Feb. 16, 1939  2 Sheets-Sheet 1
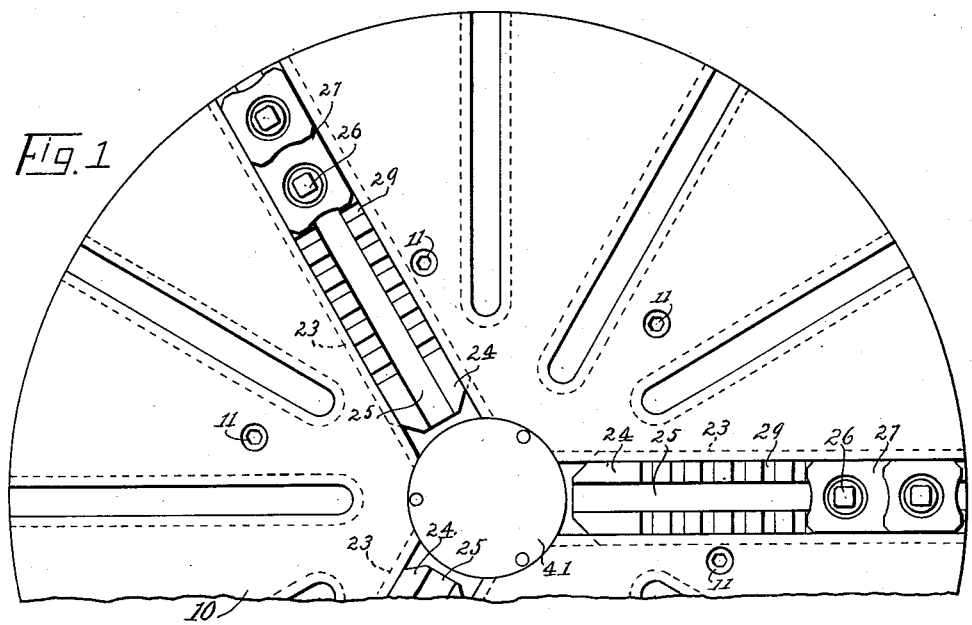
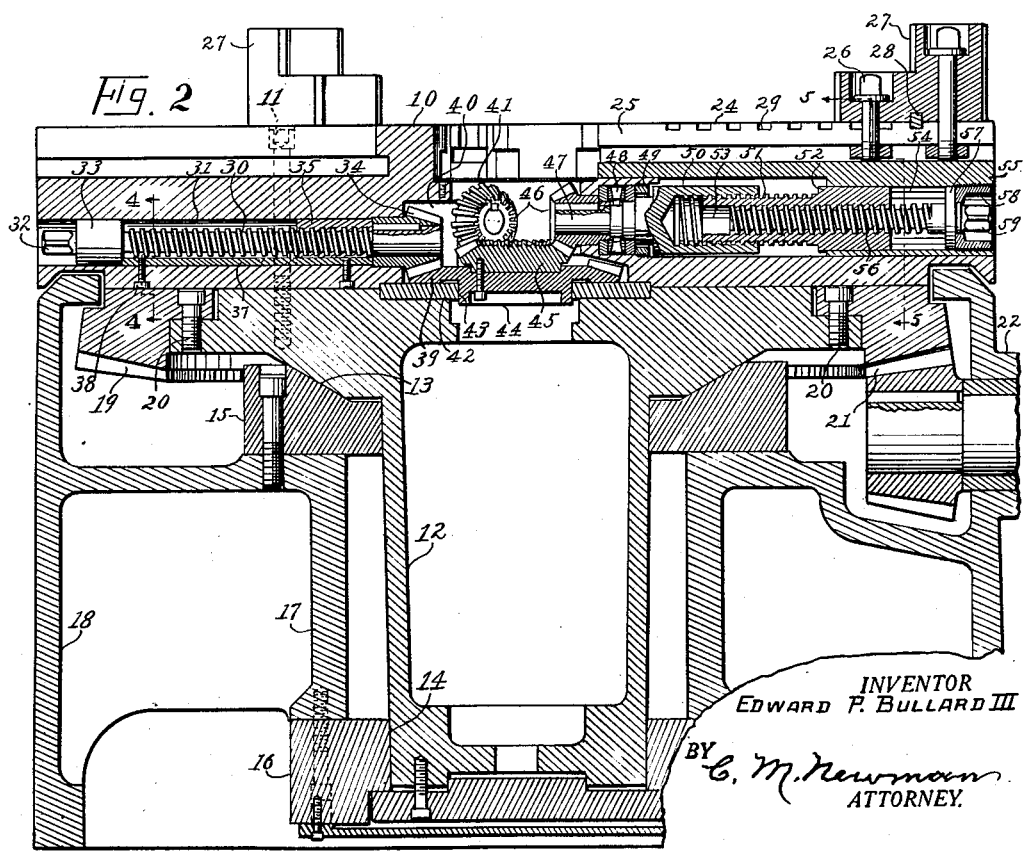
INVENTOR
EDWARD P. BULLARD III
BY C. M. Newman
ATTORNEY.

June 10, 1941.  E. P. BULLARD, 3D  2,245,384
CHUCK OPERATING MECHANISM
Filed Feb. 16, 1939   2 Sheets-Sheet 2
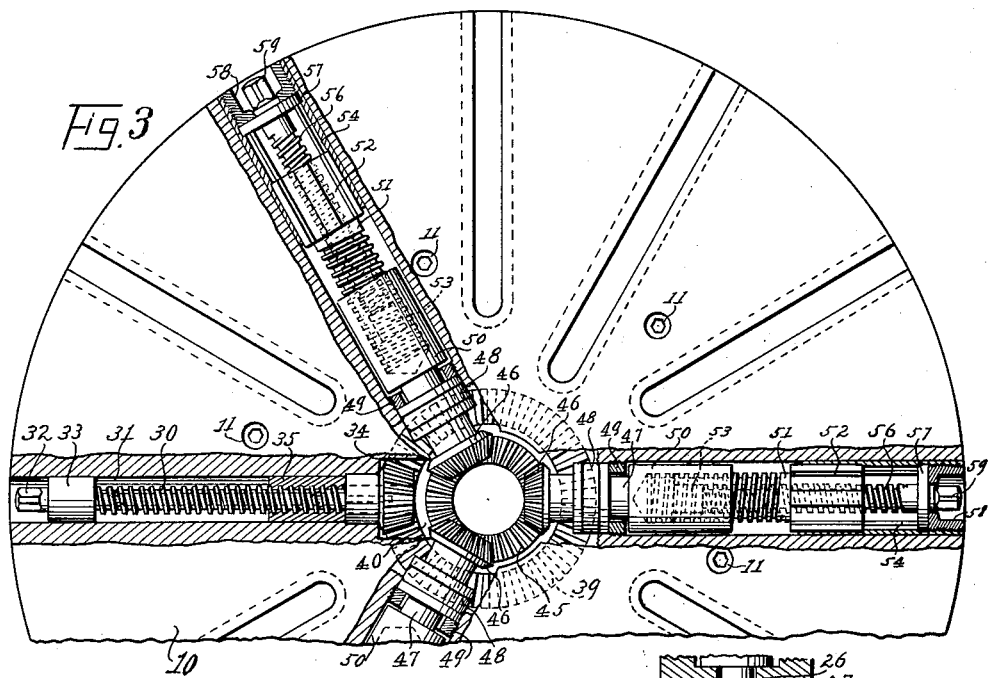
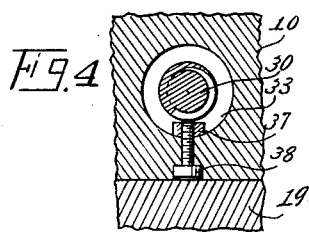
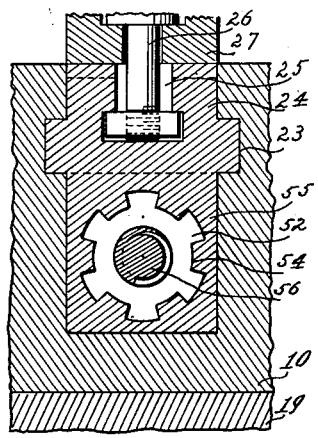
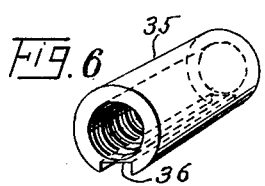
INVENTOR
EDWARD P. BULLARD III
BY
ATTORNEY Patented June 10, 1941

2,245,384

UNITED STATES PATENT OFFICE 2,245,384

CHUCK OPERATING MECHANISM

Edward P. Bullard, III, Fairfield, Conn., assignor to The Bullard Company, a corporation of Connecticut Application February 16, 1939, Serial No. 256,758

13 Claims. (Cl. 279—112)

This invention relates to an improved chuck and operating means therefor, particularly for turning machines of the single spindle type but may be used in various types of machines where a chuck of strong holding power is desired.

A primary object of the invention is to provide a chuck operating means in which the movement and holding power of the jaws depends upon a bevel geared train in conjunction with internally and externally threaded members.

An object of the invention is to provide a chuck actuating means which will exert a powerful hold upon the work placed upon the chuck.

Another object is to provide a chuck operating mechanism in which the jaws may be adjusted, relative to the work, singly or collectively.

A further object is to provide in a chuck a mechanism which will limit the inward and outward movement of the jaws.

Other objects of the invention include the provision of a chuck in which the force applied to the jaw moving means is amplified and transmitted to the jaws; the provision of a chuck in which the jaws may be simultaneously and independently moved and in which the simultaneously movable means includes means for amplifying the force applied thereto and for transmitting the amplified force to the jaws; the provision of a chuck in which the jaws may be independently and simultaneously moved and in which both of said means are aligned to thereby reduce to a minimum, the leverage between the point of power application and the point of engagement between the jaws and the work; and the provision of such a chuck in which a common element connects the means for independently and simultaneously moving the jaws.

With the above and other objects in view an embodiment of the invention is shown in the accompanying drawings in which:

Figure 1 is a plan view of a chuck table incorporating one embodiment of the invention.

Figure 2 is a vertical sectional view of the chuck table mounted upon a spindle for rotation in a machine.

Figure 3 is a plan view similar to Figure 1 but part of the table cut away to disclose the chuck operating means.

Figure 4 is an enlarged section on line 4—4 of Figure 2.

Figure 5 is an enlarged section taken on line 5—5 of Figure 2.

Figure 6 is an enlarged detail perspective view of the jaw movement limiting nut.

The chuck actuating mechanism constituting the present invention is equally applicable to either chucks of large size for single spindle machines or for small size chucks on multiple spindle machines. The chuck mechanism illustrated and described discloses manual means for actuating the jaws singly or collectively but mechanical power means could be substituted to actuate the jaws collectively.

For the purpose of illustration, the invention is disclosed as a three jaw chuck, but the principle is equally applicable to a chuck incorporating one, two or four jaws. In this particular form of the invention the device consists of a faceplate or table secured to a spindle for rotation in the base of a machine. Associated with the face-plate are reciprocable work-holding jaws actuated by crank members at convenient locations on the circumference of the face-plate. A bevel gear arrangement in the center of the faceplate transmits the actuation of the crank members to each jaw through a threaded sleeve rotating over a non-rotatable axially-movable threaded member. Thus, the rotating motion of the threaded sleeve is translated into a reciprocating motion in the non-rotating member, and in turn to the work-holding jaws. This construction reduces to a minimum the distance between the force that moves the jaws and the points on the jaws at which the work is engaged, thereby minimizing the leverage between said force and the point of gripping the work. Crank members are also provided for individually adjusting each work holding jaw.

Another feature of the invention is a precautionary measure to limit the reciprocation of the work-holding jaws in the form of a reciprocating sleeve associated with the crank actuating member. The amount of reciprocation of the sleeve being limited, the actuation of the crank member is also limited, which in turn limits the actuation of the work-holding jaws.

The chuck actuating mechanism, as disclosed in the drawings, is incorporated in a three jaw table 10 of the usual face-plate design. The table 10 is secured by bolts 11 to a vertically disposed spindle 12 provided with an upper conical bearing surface 13 and in downward spaced relation further provided with a vertical bearing surface 14. The surfaces 13 and 14 bear against rings 15 and 16 respectively, so secured in a web 17 to support the spindle vertically for rotation in the center of a machine base 18. The spindle 12 is further provided with an annular ring gear 19 secured thereto by screws 20. A spindle gear 21, journaled in a housing 22 in the base 18 and in engagement with the ring gear 19, may be provided with suitable drive means (not shown) for rotating the chuck table 10.

The chuck table illustrated is provided with three radial inverted T slots 23 within which are mounted sliding jaws 24 for inward and outward movement. Each sliding jaw 24 is provided with a longitudinal inverted T slot 25 to accommodate bolts 26 to secure top jaws 27 thereon. A key 28 is so positioned upon the under side of each top jaw 27 as to engage any one of several keyways 29 on the upper side of the sliding jaw 24, thereby securely locking the jaws together.

The invention which is concerned with a novel means for actuating the sliding jaws 24 either individually or collectively, comprises, in the chuck table illustrated, a single threaded shaft 30 located in a bore 31 in the table 10, but it will be apparent two or more such actuating means may be built into the chuck table allowing the operator to actuate the jaws from different sides of the chuck table.

The threaded shaft 30 is provided at the outer end with a square section 32 to accommodate a wrench (not shown) by which an operator may adjust the jaws as will be described. The shaft 30 is further provided with an enlarged bearing section 33 which fits snugly in the bore 31.

The inner end of the threaded shaft 30 is provided with a pinion 34 keyed thereto for rotation therewith when the jaws are adjusted by the operator. A nut 35, adapted for horizontal sliding movement, occupies a portion of the bore 31 between the bearing section 33 and the pinion 34. The nut 35 is fixed against rotation with respect to the shaft 30 by a keyway 36 (Figure 6) in the nut engaging a key 37 secured to the table 10 by screws 38. The pinion 34 is in engagement with a bevel gear 39 located in a recess 40 in the center of the table 10. The recess 40 is provided with a cover 41 to prevent the entrance of chips and cutting fluid.

The gear 39 is securely positioned for rotation centrally in the table by an apertured bearing member 42. The upper surface of the member 42 provides a bearing for the lower face of the gear 39 and an aperture 43 provides a bearing for a downwardly extending hub 44 on the gear. The bevel gear 39 is adapted to support upon its upper surface for rotation therewith a smaller bevel gear 45. Meshing with the bevel gear 45 are three bevel gears 46 keyed to the ends of their respective shafts 47. The members or shafts 47, radiating from the center of the table, are journaled for rotation in thrust bearings 48 held in place by threaded collars 49. The outer end of each shaft 47 is enlarged and formed into a hollow internally threaded element or sleeve 50 to receive a non-rotatable threaded shaft 51. Each shaft 51 is also provided with an enlarged externally splined portion 52 (see Figure 5), and further provided with an internally threaded axially extending hole 53.

The externally splined portion 52 of each shaft 51 is in sliding engagement with a correspondingly splined bore 54, located in a downwardly extending block 55 on each sliding jaw 24. A sliding jaw adjusting element or screw shaft 56 is centrally located in the bore 54, the threaded portion of the screw 56 engaging the threaded portion of the hole 53 in the shaft 51. The screw 56 is provided, adjacent the outer end, with a collar 57 which bears against the splined portion of the bore 54 and is held against longitudinal movement in the jaw block 55 by a recessed nut 58. The outer end of the screw 56 is provided with a square section 59 to accommodate a wrench (not shown). The construction including the multi-gears 39 and 45 amplifies the force applied to the shaft 30 and transmits the same to the jaws through the individually adjustable means.

The operation of the chuck will now be described.

Universal movement of the sliding jaws may be accomplished by the rotation of the shaft 30, either with a wrench placed upon the square portion 32, or by any other suitable means. Rotation of the shaft 30 will impart rotation to the pinion 34 and the companion bevel gear 39. The bevel gear 45 attached to the bevel gear 39 will also rotate and transmit rotation to three bevel pinions 46. Each pinion 46 will rotate its respective shaft 47 with its integral threaded sleeve 50. Each sleeve 50 engages the correspondingly threaded portion of the aligned shaft 51. Each of said shafts 51 is fixed with respect to the rotation of their respective sleeves 50 by the splines on the shafts engaging the splined portions 54 in the jaw blocks 55. Each shaft 51 is held in adjusted position in the splined portion of their respective blocks 55 by the adjusting screws 56.

It will be apparent the threads in the rotating sleeve 50 engaging the threads on the non-rotating shaft 51 will cause horizontal movement to the shaft 51 and through the screw 56 to the sliding jaw 24.

Individual adjustment of each sliding jaw 24 may be made by rotation of the sliding jaw adjustment screw 56. As the shaft 51 is fixed against horizontal movement by its engagement with the sleeve 50, rotation of the shaft 56, by a wrench placed on the square end, will cause horizontal movement to the sliding jaw 24 and the work holding jaw 27 attached thereto.

In order to limit the universal adjustment of the sliding jaws and prevent the disengagement of certain elements in the table, which would interfere with its normal operation, an arrangement is provided comprising the circular threaded nut 35, shown in detail in Figure 6, occupying a portion of the bore 31 and mounted upon the threaded shaft 30. The nut 35 is fixed against rotation on the shaft 30 by the keyway 36 on the nut engaging the key 37 which is secured in the bore by the screws 38. It is therefore apparent that rotation of the shaft 30 will move the nut longitudinally in the bore 31. The movement is limited at one end by the pinion 34 and at the other end by the bearing section 33. The number of rotations that can be given to the shaft depends upon the number of rotations required to move the nut longitudinally from the pinion at one end of the shaft to the bearing at the other end. This in turn limits the rotation of the gears 34, 39 and the pinions 46 thus limiting the universal movement of the jaws 24.

While the invention has been described and illustrated in detail in one form, various modifications may be made in the manner of actuating the jaws either manually or by power without departing from the spirit and scope of the invention as outlined in the appended claims.

Having thus described my invention what I claim and desire to secure by Letters Patent is:

1. In a chuck actuating mechanism, a table; a jaw slidably mounted therein; a gear centrally located axially of said table; a rotatable member adapted to be driven by said gear; hollow internally-threaded motion-transmitting means integral with said member; a non-rotatable, axially-movable member threadedly connected to said motion-transmitting means; a rotatable element journaled in said jaw, connected to, and including means for moving said jaw relatively to said non-rotatable member; and means for rotating said gear, said gear-rotating means being adapted to advance or retract said slidably mounted jaw relatively to the center of the table.

2. In a chuck of the class described, a table, a plurality of jaws, one or more of which is slidably mounted therein, a gear, means for operating the gear, a rotatable member connected to be operated by said gear, a hollow threaded sleeve integral with said member, a non-rotatable member in threaded engagement with said hollow threaded sleeve and splined for longitudinal movement in a portion of the jaw and means to secure the non-rotatable member and jaw together including a rotatable element in threaded engagement with separate threads of said non-rotatable member, whereby said rotatable element is adapted to telescope said non-rotatable element and said sleeve.

3. In a chuck operating mechanism, a table, a plurality of jaw carrying members slidably mounted therein, jaws adjustably mounted on said members, means to advance or retract said slidable jaws simultaneously relative to the center of said table comprising a rotatable gear centrally located in said table, a second gear secured to said centrally located gear for rotation therewith, a plurality of gears engaging said second gear secured to rotatable shafts radiating from the center of said table and secured against axial movement, hollow internally threaded sleeves integral with said shafts, non-rotating members threadedly connected to said threaded sleeves, rectilinearly movable in response to the rotation of said sleeves and adjustably secured in said slidably mounted jaws, and means for manually rotating said first mentioned centrally located gear.

4. In a chuck operating mechanism, a table, a plurality of jaws slidably mounted therein, means to advance or retract said slidably mounted jaws simultaneously relative to the center of the table comprising a rotatable ring bevel gear centrally located in said table, a second gear secured to said centrally located ring bevel gear, a plurality of gears engaging said second gear secured to rotatable shafts radiating from the center of said table and secured against axial movement, hollow threaded sleeves integral with said shafts, non-rotating threaded members rectilinearly movable in response to the rotation of said sleeves, adjustably secured in said slidably mounted jaws, means for manually actuating said first mentioned centrally located ring gear comprising a pinion engaging said gear integral with an externally threaded shaft aligned with said pinion and radiating from the center of the table, a non-rotating internally threaded sleeve engaging said externally threaded shaft to reciprocate upon rotation of said shaft, stop means disposed in the path of said sleeve to limit the reciprocation thereof, said stop means adapted to limit the rotation of said threaded shaft.

5. In a chuck actuating mechanism, a table; a jaw slidably mounted therein; a gear centrally located axially of said table; a rotatable member adapted to be driven by said gear; hollow internally-threaded motion-transmitting means integral with said member; a non-rotatable internally and externally threaded member in threaded engagement with said motion transmitting means, the said internally and externally threaded member being mounted in and held against rotation in said jaw but permitted to be adjusted longitudinally therein; a screw journaled in said jaw and threadedly engaging the internal threads of said internally and externally threaded member; and means for rotating said gear, said gear-rotating means being adapted to advance or retract said slidably mounted jaw relatively to the center of the table.

6. In a chuck, a table, a plurality of jaws slidably mounted therein, a double-faced centrally located gear, means for operating the same including a pinion and a threaded operating shaft upon which said pinion is mounted, means adapted to limit the rotation of said threaded shaft and its pinion including a threaded sleeve reciprocally mounted on said threaded shaft, a series of rotatable members geared to be operated by said double-faced gear each including a threaded sleeve, a non-rotatable internally and externally threaded sleeve in engagement with each of said rotatable members, and a screw mounted in each jaw and engaging the internal threads of the non-rotatable sleeves for adjusting the jaws.

7. A work-supporting chuck for a machine tool comprising in combination, a table; a plurality of slidable members mounted on said table and adapted to support jaws for engaging work; means for independently moving said slidable members; and means for simultaneously moving said slidable members including rotatable members axially aligned with said independent member-moving means; both said independent and simultaneous member-moving means including common means that is cooperative with both said member-moving means without modifying the range of adjustment of either of said member-moving means.

8. A work-supporting chuck for a machine tool comprising in combination, a table; a plurality of slidable members mounted on said table and adapted to support jaws for engaging work; means for independently moving said slidable members; means for simultaneously moving said slidable members including rotatable elements that are adapted to be rotated by a rotatable shaft; and means for amplifying the force applied to said shaft and for transmitting said amplified force to said rotatable elements; both said independent and simultaneous member-moving means including common means that is cooperative with both said slidable member-moving means without modifying the range of adjustment of either of said member-moving means.

9. In a work-supporting chuck for a machine tool comprising in combination, a table; a plurality of slidable members mounted on said table and adapted to support jaws for engaging work; means for independently moving said slidable members; and means for simultaneously moving said slidable members including rotatable members axially aligned with said independent member-moving means; both said independent and simultaneous member-moving means including a common non-rotatable axially-slidable means that is cooperative with both said member-moving means without modifying the range of adjustment of either of said member-moving means.

10. In a chuck device, the combination of a work-supporting table; a plurality of slidable jaws mounted on said table; means for moving said jaws radially with respect to said table including a rotatable threaded shaft journaled in each of said jaws but fixed against axial movement relatively thereto; axially-movable non-rotatable members into which each of said shafts is threaded; and means for effecting the axial movement of said members including an internally-threaded element threaded onto external threads on each of said axially-movable members whereby said jaws may be moved radially on said table either by the rotation of said threaded shafts or by the rotation of the internally threaded elements.

11. In a chuck actuating mechanism, a table; a plurality of jaws slidably mounted therein; a gear centrally located axially of said table; a plurality of rotatable members adapted to be driven by said gear; hollow internally-threaded sleeves integral with said members; a non-rotatable axially-movable internally and externally threaded member threaded in each of said threaded sleeves; a rotatable externally-threaded element journaled in each of said jaws and threaded in said non-rotatable members; and means for rotating said gear, said means being adapted to advance and retract said slidably mounted jaws relatively to the center of the table.

12. In a chuck operating mechanism, a table; a plurality of jaws slidably mounted therein; aligned means adapted to reciprocate said jaws simultaneously and independently relatively to the center of said table, said means including aligned rotatable threaded shafts for each of said jaws, and a non-rotatable threaded member for each of said jaws adapted to cooperate with said shafts; a separate rotatable shaft adapted to drive one of said aligned shafts for each of said jaws for simultaneously reciprocating said jaws; means for limiting the reciprocation of said jaws including a nut threaded onto said separate shaft; and means for limiting the reciprocation of said nut.

13. A chucking device comprising in combination, a table having a plurality of radially-disposed guideways; jaws slidably mounted in said guideways; means for applying a direct radial force independently to each of said jaws along the radial centerlines of said guideways; means for applying a direct radial force simultaneously to said jaws along the radial centerlines of said guideways including means in axial alignment with said independent force applying means; and means providing for the adjustment of said simultaneous and independent force-applying means over a fixed range of action regardless of the adjustment of either of said force-applying means.

EDWARD P. BULLARD, III.